Figure 1:
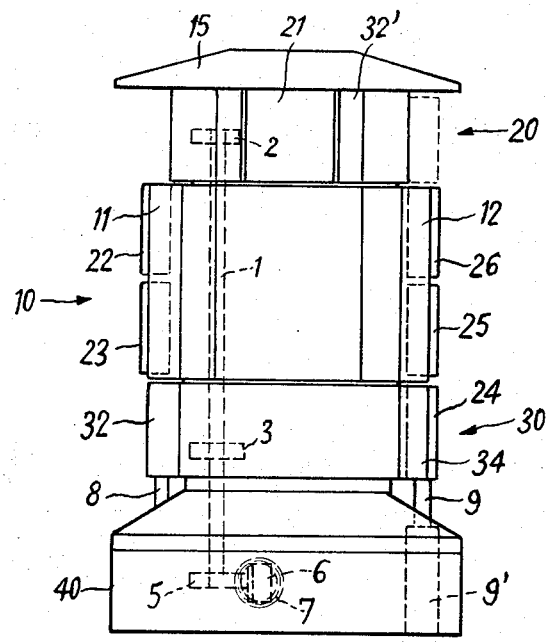

Sept. 26, 1967   M. BAUBLYS ETAL   3,343,244
WORKPIECE CONVEYOR FOR MACHINE TOOLS AND THE LIKE
Filed Jan. 27, 1966                                         3 Sheets-Sheet 1

Inventors
Mikas Baublys
Eugen Sigloch
By Richard

Sept. 26, 1967  M. BAUBLYS ETAL  3,343,244
WORKPIECE CONVEYOR FOR MACHINE TOOLS AND THE LIKE
Filed Jan. 27, 1966                         3 Sheets-Sheet 3

Inventors
Mikas Baublys, Eugen Sigloch

United States Patent Office 3,343,244
Patented Sept. 26, 1967

3,343,244
WORKPIECE CONVEYOR FOR MACHINE TOOLS
AND THE LIKE
Mikas Baublys and Eugen Sigloch, both of 62 Denner-
strasse, Stuttgart-Bad Cannstatt, Germany
Filed Jan. 27, 1966, Ser. No. 523,292
Claims priority, application Germany, Jan. 29, 1965,
B 80,317
7 Claims. (Cl. 29—38)

This invention relates to machine tools, and particularly to a conveyor arrangement for moving workpieces between several work stations at which they may be worked upon by power-driven tools.

It is known to perform a plurality of operations on the same workpiece by means of multi-spindle lathes and the like in which several tools are sequentially moved into cutting or forming engagement with the same workpiece. Machine tools of this type have relatively low capacity since the number of operations performed at the same time is limited.

It is also known to move a workpiece on a conveyor from one work station to another, and to have a machine tool perform an operation on the workpiece at each station so that all tools operate simultaneously, and substantially continuously. The known conveyorized arrangements of the type described have inherently high output rates, but they require much floor space and the extensive conveyors needed are costly to build and to operate.

The primary object of the invention is the provision of a conveying arrangement for a workpiece occupying but a minimum of space and providing a multiplicity of work stations which are spaced closely for convenient inspection, yet are each readily accessible.

Yet another object is the provision of a conveying arrangement in which the workpieces are firmly held in each station in a precisely defined position.

With these and other objects in view, as will become apparent hereinafter, the invention in one of its aspects mainly resides in a stationary column on which guides are provided for guiding workpiece supports in two horizontally spaced, vertically extending paths. A lower transfer device transfers the supports from the lower terminal portion of one path to the lower terminal portion of the other path, and an upper transfer device transfers the workpiece supports from the upper terminal portion of the other path to that of the one path.

A lifting device is provided for lifting a workpiece support from the lower terminal portion of the aforementioned other path to a higher level intermediate the terminal portions where it may be secured by a releasable securing device. An actuating arrangement is connected to the two transfer devices, the lifting device, and the securing device for operating the same in timed sequence.

One or more additional securing devices may be provided in each of the two paths for holding workpieces at work stations which are vertically spaced in each path within range of tools mounted near the column.

Figure 2:
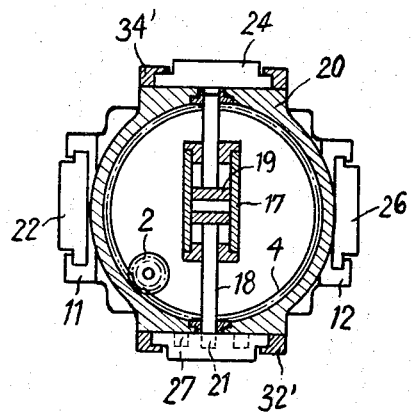
Figure 3:
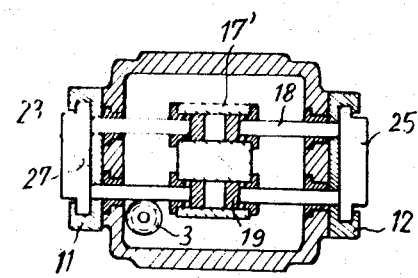
Figure 4:
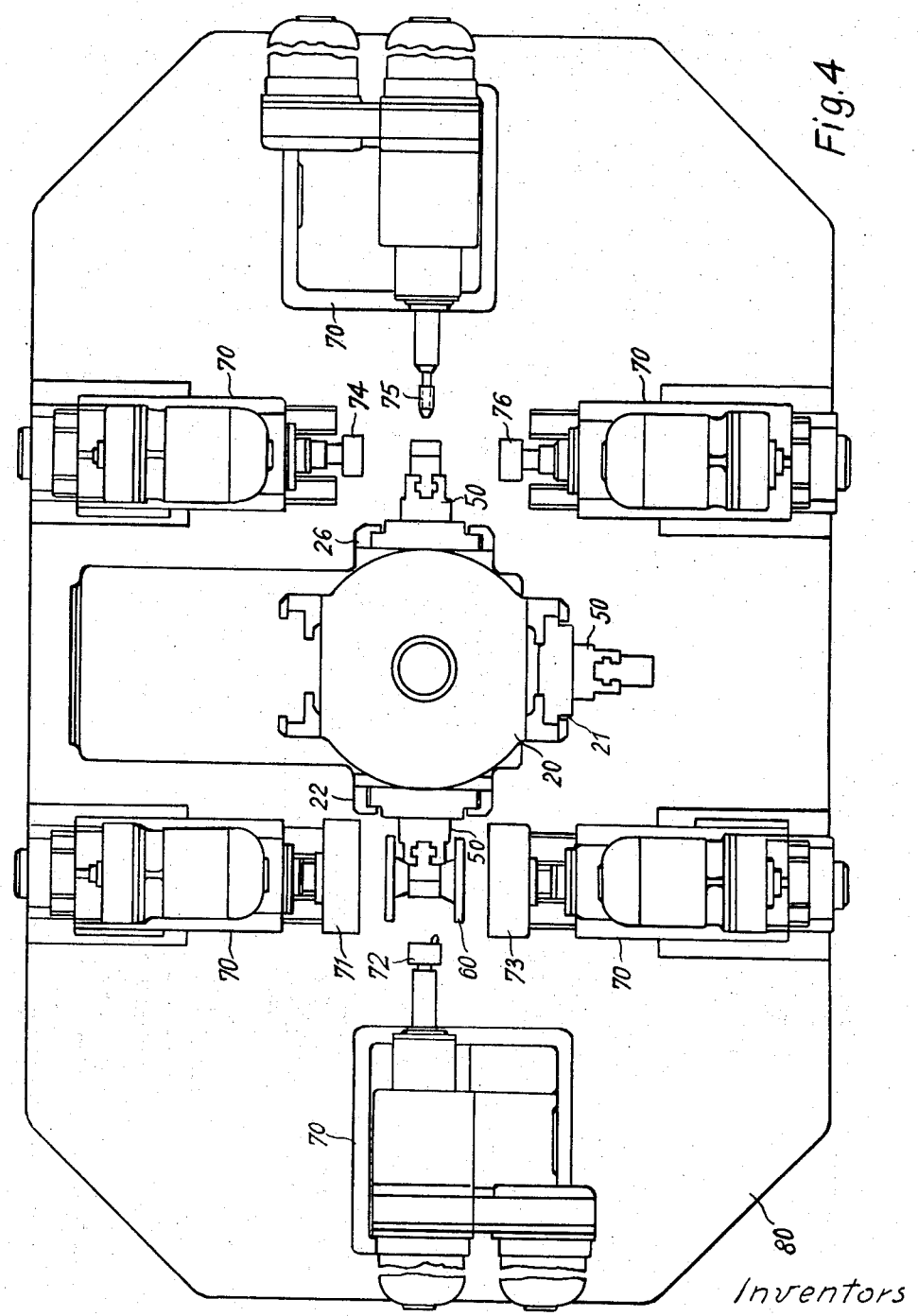
Figure 5:
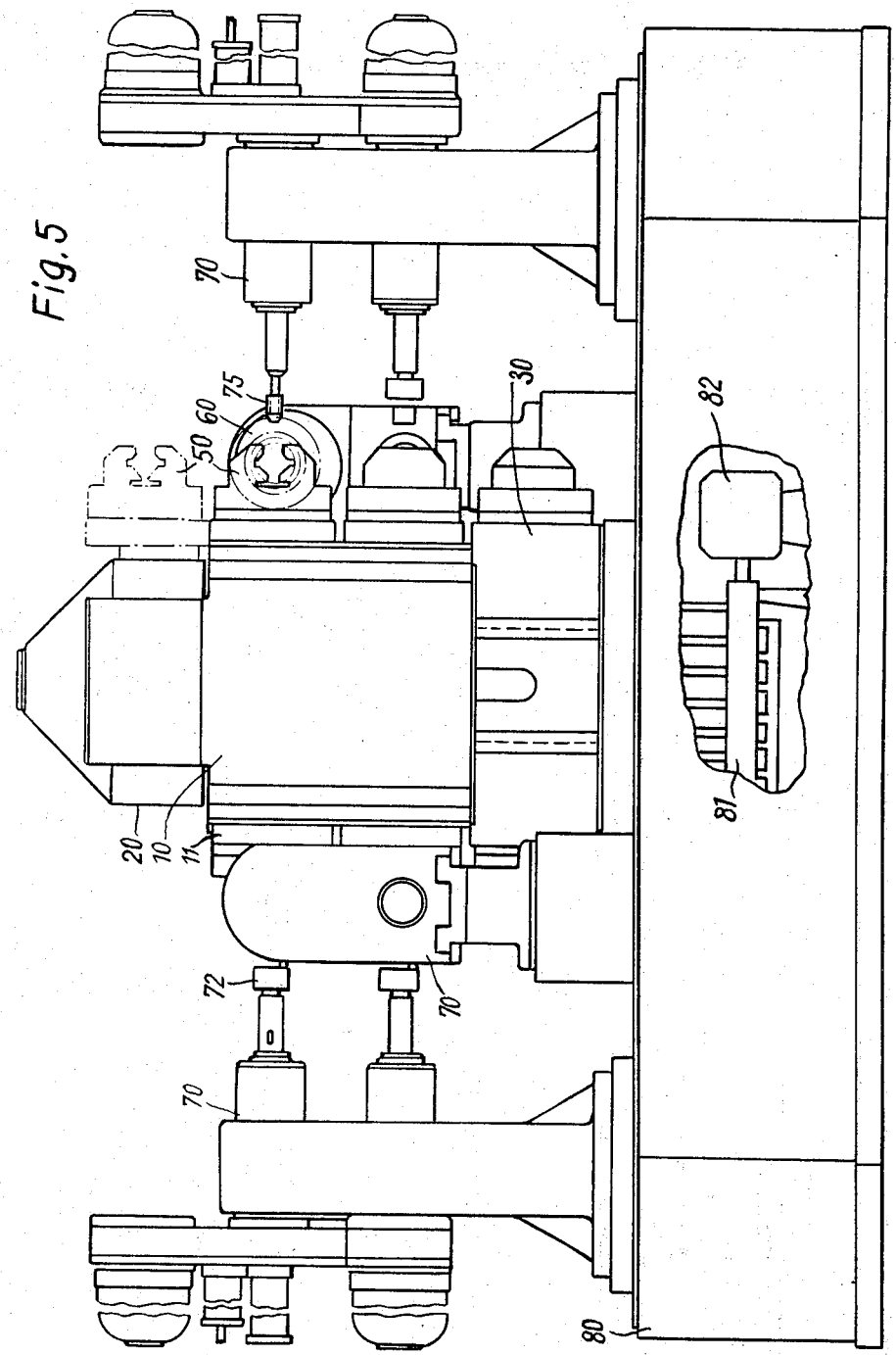

The exact nature of this invention as well as other objects and advantages thereof will be readily apparent from consideration of the following specification relating to the annexed drawing in which:

FIG. 1 shows a conveyor of the invention in elevation;
FIG. 2 is a plan section of the conveyor of FIG. 1 on the line II—II;
FIG. 3 shows the conveyor in section on the line III—III in FIG. 1;
FIG. 4 is a top plan view of a multiple machine tool arrangement including the conveyor of FIGS. 1 to 3; and
FIG. 5 shows the arrangement of FIG. 4 in elevation with a portion of a base enclosure broken away to reveal internal structure.

Referring now to the drawing in detail, and initially to FIG. 1, there is seen a stationary column 10 which is a heavy-walled hollow casting of approximately square cross section as best seen in FIG. 3 and stands on a hollow base 40. Two annular turntables 20, 30 are respectively mounted on the top and near the base of the column 10 on non-illustrated bearings which permit the turntables 20, 30 to rotate about a common vertical axis.

Two pairs of vertical guide rails 11, 12 are mounted on respective opposite outer walls of the column 10 and provide vertical guideways for identical slides 21–26, the slides 22, 23 being received in one of the vertical guideways, and the slides 25, 26 in the other guideway. The slides 21–26 are recessed in a manner not illustrated in FIGS. 1 to 3 to receive work carriers 50 as will be described hereinbelow with reference to FIGS. 4 and 5.

The two substantially identical turntables 20, 30 each have two pairs of guide rails 32, 34, 32', 34' which define guideways identical in cross section with those of the column 10, but long enough only to hold one of the slides 21–26 each, the slide 21 being received in the upper turntable 20, and the slide 24 being received in a guideway of the lower turntable 30. While the guideways of the two turntables are shown in FIG. 1 offset 90° about the common axis of the turntables for the sake of clearer illustration, it will be understood that they are normally vertically aligned with each other as seen in FIG. 2.

A drive shaft 1 is journaled in the base 40 and the column 10 in a manner not further illustrated and extends vertically from the base to the upper turntable 20. Pinions 2, 3 on the shaft 1 mesh with internal ring gears on the two turntables, only the ring gear 4 of the turntable 20 being shown in FIG. 2. A gear 5 is mounted on the bottom end of the shaft 1 by means of a one-way clutch (not specifically shown) and is engaged by a rack 6 which is mounted in the base 40 on the piston of a double-acting hydraulic cylinder 7, the stroke of the rack being such that the turntables 20, 30 are turned 90° by the meshing gears when the rack is moved in one direction by the cylinder 7, while the turntables stand still during the return stroke of the rack.

A fixed stop 8 is mounted on the base 40 in vertical alignment with the guideway of the rails 11, whereas a stop 9 under the guideway of the rails 12 can be shifted vertically upward from the position illustrated in FIG. 1 by a hydraulic cylinder 9' in the base 40, the stroke of the stop 9 being equal to the length of a slide 21–26.

As shown only in the slide 21 in FIG. 2 and the slide 23 in FIG. 3, each of the slides 21–26 has three locating recesses 27 in the face directed toward the walls of the guideways in which the slide is received. A hydraulic cylinder 17 is fixedly mounted in the turntable 20. The piston rods 18 of two pistons 19 project axially from opposite ends of the cylinder 17. The two pistons 19 divide the cylinder 17 into three compartments connected to a control valve in a non-illustrated conventional manner so that each compartment may be connected individually to the pressure pump or to the sump of a hydraulic system only partly illustrated in the drawing, and entirely conventional in all respects not specifically shown.

The free ends of the piston rods 18 are aligned with radial openings in the turntable 20 and constitute locating pins which may be passed outward into the guideways of the rails 32', 34' for engagement with corresponding locating recesses of slides 21–26. As partly shown in FIG. 3, a twin cylinder 17' is arranged in the column 1 on each of two levels. Each twin cylinder is equipped with two pairs of pistons 19, and the associated piston rods 18 provide a pair of locating pins for each of the four slides received in the guideways of the column 1.

The afore-described conveyor operates as follows:

In the starting position of the conveyor, four slides 22, 23, 25, 26 are held in fixed superposed positions in the two guideways of the column 1 by locating pins 18. The guideways of the turntables 20, 30 are offset 90° from those of the column 1. Each turntable holds one slide, the slide 21 received in the upper turntable 20 being held by an associated locating pin 18 as shown in FIG. 2, and the slide 24 received in the lower turntable 30 being vertically retained in the receiving guideway by a stationary guide on the base 40, not shown in the drawing.

The cylinder 17 in the turntable 20 selectively retracts the locating pin 18 from the slide 21 so that the slide and elements supported thereon in a manner more fully apparent from FIGS. 4, 5 may be removed from the conveyor and replaced by another slide 21. The newly inserted slide is fastened in position by the advancing associated locating pin 18, and the turntables 20, 30 are indexed 90° in a clockwise direction, as viewed in FIG. 2 by a reciprocating movement of the rack 6.

All locating pins 18 are then withdrawn, whereby the slides 21, 22, 23 drop in the aligned guideways of the rails 32', 11, 32 toward the stop 8 which arrests the slide 23 in the guideway of the rails 32 of the lower turntable 30 whereas the slides 21, 22 assume the previous positions of the slides 22, 23 respectively as shown in FIG. 1.

The indexing movement of the turntable 30 brings the slide 24 from the position shown in FIG. 2 into that illustrated in FIG. 1. When the cylinder 9' is next provided with pressure fluid, the stop 9 lifts the stack of slides 24, 25, 26 by the vertical length of one slide until the slide 26 rises to the position indicated in broken lines and is received in the guide rails 34' of the upper turntable 20. All locating pines 18 are then advanced to their operative positions and the turntables are indexed 90°, whereby the starting condition of the conveyor is restored, all slides being advanced on step.

Theslides remain in each of the two positions in the vertical guideways of the column 1 during two indexing movements of the turntables 20, 30, and are held precisely in their positions by the locating pins. A workpiece mounted on a slide may therefore be subjected to cutting, shaping or other operations by means of one or more tools at each of the four work stations defined on the column 1 by the positions of the slides 22, 23, 25, 26 shown in FIG. 1.

The cooperation of the conveyor with a battery of pairs of rotary tools 71–76 driven by individual electric motors and mounted on respective slide arrangements 70 for movement toward and away from each work station is shown by way of example in FIGS. 4 and 5. Work holders 50 adapted for clamping a workpiece 60 are attached to each slide 21–26 and each of the slides with the associated holder 50 constitutes a workpiece support.

The conveyor and the tools are mounted on a common hollow foundation 80 enclosing most stationary elements of the hydraulic system which automatically indexes the turntables 20, 30, extends and retracts the locating pins 18, and operates the lifting cylinder 9'. Only a portion of a multi-way rotary valve 81 and the synchronous electric motor 82 which rotates the valve are seen in FIG. 5, but it will be understood that the foundation 80 may also enclose the pressure pump and the sump of the hydraulic system.

The workpieces 60 cannot be precisely positioned in the several work stations with respect to the tools 71–76 unless the slides 21–26 abuttingly engage the rails 11, 12 under the pressure of the locating pins 18. It is important, therefore, to keep the guideways free of metal particles and dust. A dust cover is therefore being provided on the upper turntable 20, as shown in FIG. 1. The cover has been omitted from FIGS. 4 and 5 for the sake of clarity. It will also be understood that jets of compressed air are being directed against all exposed surfaces that are to be kept clean, and that suction devices are provided to remove chips and cuttings in a manner conventional in itself.

In operating the machine shown in FIGS. 4 and 5, a slide and holder carrying a finished workpiece is removed from the conveyor position occupied by the slide 21 in FIGS. 1 and 4, and a workpiece support holding a blank is inserted into the same position twice during each revolution of the turntables 20, 30. All other operations are performed automatically by the machine under the control of the motor 82 and of the rotary valve 81 which may also control the tool slides 70 in a known manner.

Three different tools may work on a workpiece at each station of the conveyor without unduly obstructing access to the working area as is evident particularly from FIG. 4. Yet, the entire apparatus occupies but very little floor space. If very complex operations are to be performed, a column having more than two working levels may be substituted for the column 1 in an obvious manner. An additional set of locating pins is needed for each pair of additional work stations. If relatively simple operations requiring but few tools are to be performed, it is evident that completed pieces may be withdrawn and blanks may be inserted in the position occupied in the lower turntable by the slide 24 in FIG. 2 so that two streams of workpieces pass through the conveyor simultaneously. Other arrangements which utilize the inherent flexibility of the conveyor will readily suggest themselves to those skilled in the art.

It is specifically contemplated to equip the stationary column with more than two vertical guideways and/or to provide the turntables with more than two pairs of guide rails, all guide rails of the turntable being alignable with all guideways of the column. If the necessary dwell time in the work stations is relatively short, the turntables 20, 30 may each be provided with four pairs of guide rails offset 90° from each other so that the slides in one guideway of the column 1 may be dropped and those in the other guideway may be lifted while finished workpieces are being removed, and new blanks are being inserted.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:
1. A conveying arrangement for conveying workpieces comprising, in combination:
 (a) a stationary column;
 (b) guide means on said column for guiding a plurality of workpiece supports in first and second horizontally spaced, vertically extending paths having respective upper and lower terminal portions;
 (c) first transfer means on said column for transferring said supports from the lower terminal portion of said first path to the lower terminal portion of the second path;
 (d) second transfer means on said column for transferring said supports from the upper terminal portion of said second path to the upper terminal portion of said first path;
 (e) lifting means for lifting a support from said lower terminal portion of said second path to a higher level of said second path intermediate said terminal portions of the same;
 (f) releasable securing means for securing the lifted support at said higher level; and
 (g) actuating means operatively connected to said first and second transfer means, said lifting means, and said securing means for operating the same in timed sequence.

2. An arrangement as set forth in claim 1, further comprising additional releasable securing means for securing a workpiece support at a predetermined level intermediate said terminal portions of said first path, said additional releasable securing means being operatively connected to said actuating means for operation thereby in said timed sequence.

3. An arrangement as set forth in claim 1, wherein at least one of said transfer means includes a turntable mounted on said column for rotation about a vertical axis and formed with a plurality of receptacles, two of said receptacles being simultaneously alignable with respective terminal portions of said first and second paths in the direction of support movement in said paths, each receptacle being adapted to receive one of said supports for transferring the same from one of said path to the other during rotation of said turntable.

4. An arrangement as set forth in claim 1, wherein said transfer means each include a turntable, said turntables being mounted on said column for joint rotation about a common axis, each turntable being formed with a receptacle, said receptacles being simultaneously alignable with the terminal portions of each of said path and each adapted to receive one of said supports for transferring the same between said paths during rotation of said turntable.

5. An arrangement as set forth in claim 4, wherein said actuating means include means for jointly indexing said turntables between two positions in which the receptacles are respectively aligned with the terminal portions of the first path and the terminal portions of the second path.

6. An arrangement as set forth in claim 1, wherein said securing means include a locating member mounted in said column for horizontal movement toward and away from an operative position in which a free end portion of said locating member projects into said path, the arrangement further comprising a plurality of said workpiece supports, each support being formed with a recess adapted to receive said free end portion when the support is at said higher level of said second path, said actuating means including power operated means for moving said locating member toward and away from said operative position thereof.

7. An arrangement as set forth in claim 6, further comprising a plurality of tool means arranged along said paths for work on workpieces supported by said workpiece supports while the same are secured by said locating member.

References Cited

UNITED STATES PATENTS 1,786,148   12/1930   Bullard _____ 29—38

RICHARD H. EANES, JR., *Primary Examiner.*